United States Patent [19]

Matyas et al.

[11] Patent Number: 5,164,988
[45] Date of Patent: Nov. 17, 1992

[54] METHOD TO ESTABLISH AND ENFORCE A NETWORK CRYPTOGRAPHIC SECURITY POLICY IN A PUBLIC KEY CRYPTOSYSTEM

[75] Inventors: Stephen M. Matyas; Donald B. Johnson; An V. Le, all of Manassas; Rostislaw Prymak, Dumfries, all of Va.; William C. Martin, Concord; William S. Rohland, Charlotte, both of N.C.; John D. Wilkins, Somerville, Va.

[73] Assignee: International Business Machines Corporation, Armonk, N.Y.

[21] Appl. No.: 786,227

[22] Filed: Oct. 31, 1991

[51] Int. Cl.⁵ .............................................. H04K 1/00
[52] U.S. Cl. .......................................... 380/25; 380/30
[58] Field of Search .............................. 380/23, 25, 30

[56] References Cited

U.S. PATENT DOCUMENTS

| | | | |
|---|---|---|---|
| 4,200,770 | 4/1980 | Hellman et al. | |
| 4,218,582 | 8/1980 | Hellman et al. | |
| 4,326,098 | 4/1982 | Bouricius | 380/23 |
| 4,393,269 | 7/1983 | Konheim et al. | 380/23 |
| 4,405,829 | 9/1983 | Rivest et al. | |
| 4,850,017 | 7/1989 | Matyas, Jr. et al. | |
| 4,853,961 | 8/1989 | Pastor | 380/25 |
| 4,885,777 | 12/1989 | Takaragi et al. | 380/23 |
| 4,893,338 | 1/1990 | Pastor | 380/25 |
| 4,908,861 | 3/1990 | Brachtl et al. | |
| 4,918,728 | 4/1990 | Matyas et al. | |
| 4,924,514 | 5/1990 | Matyas et al. | |
| 4,924,515 | 5/1990 | Matyas et al. | |
| 4,941,176 | 7/1990 | Matyas et al. | |
| 5,001,752 | 3/1991 | Fischer | 380/23 |
| 5,003,593 | 3/1991 | Mihm, Jr. | 380/25 |
| 5,005,200 | 4/1991 | Fischer | 380/25 |

OTHER PUBLICATIONS

R. W. Jones, "Some techniques for Handling Encipherment Keys," ICL Technical Journal, Nov. 1982, pp. 175–188.

D. W. Davies & W. L. Price, "Security for Computer Networks," John Wiley & Sons, NY, 1984, Sec. 6.5, Key Management with Tagged Keys, pp. 168–172.

W. Diffie, et al., "Privacy and Authentication: An Introduction to Cryptography," Proc. of IEEE, vol. 67, No. 3, Mar. 1979; pp. 397–427.

Primary Examiner—Thomas H. Tarcza
Assistant Examiner—David Cain
Attorney, Agent, or Firm—John E. Hoel

[57] ABSTRACT

Device A in a public key cryptographic network will be constrained to continue to faithfully practice a security policy dictated by a network certification center, long after device A's public key PUMa has been certified. If device A alters its operations from the limits encoded in its configuration vector, for example by loading a new configuration vector, device A will be denied participation in the network. To accomplish this enforcement of the network security policy dictated by the certification center, it is necessary for the certification center to verify at the time device A requests certification of its public key PUMa, that device A is configured with the currently authorized configuration vector. Device A is required to transmit to the certification center a copy of device A's current configuration vector, in an audit record. the certification center then compares device A's copy of the configuration vector with the authorized configuration vector for device A stored at the certification center. If the comparison is satisfactory, then the certification center will issue the requested certificate and will produce a digital signiture dSigPRC on a representation of device A's public key PUMa, using the certification center's private certification key PRC. Thereafter, if device A attempts to change its configuration vector, device A's privacy key PRMa corresponding to the certified public key PUMa, will automatically become unavailable for use in communicating in the network.

24 Claims, 7 Drawing Sheets

FIG. 5

CF ENVIRONMENT MEMORY 146

| MASTER KEY REGISTER(S) 151 |
| PUC PUBLIC CERT. CTR. KEY 157 |
| PRC PRIVATE CERT. CTR. KEY 159 |
| LOGICAL DEVICE ID 119 |
| IDa : PUAa : CONFIG. VEC. (a) |
| IDb : PUAb : CONFIG. VEC. (b) |

CONFIGURATION VECTOR 161

| MASTER KEY GENERATION METHOD DEFINITION | CRYPTOGRAPHIC INSTRUCTIONS DEFINITION BIT MASK | KEY MANAGEMENT PROTOCOL DEFINITION | CF BACKUP PROTOCOL DEFINITION | OTHER CRYPTO FACILITY DEFINITION |

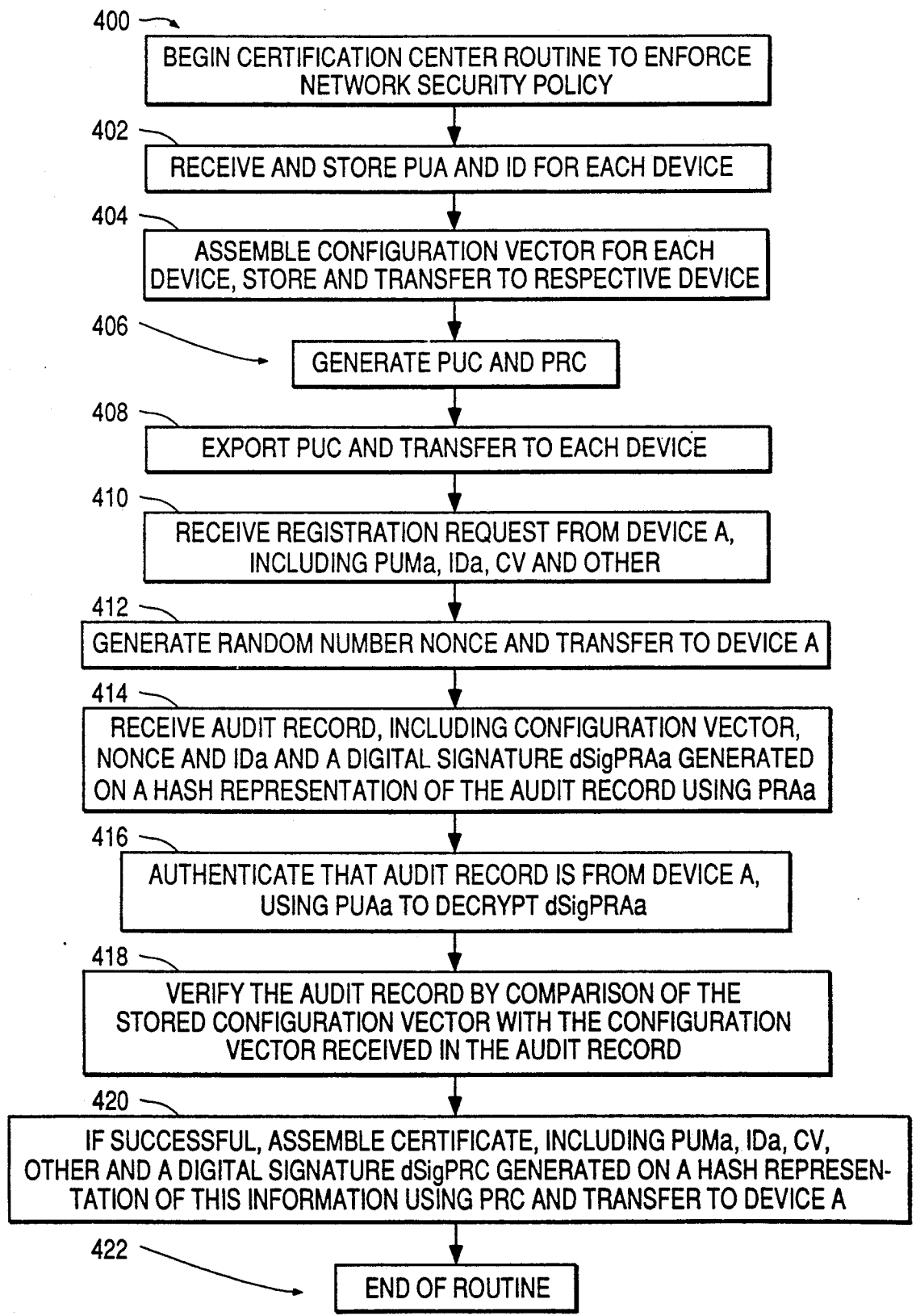

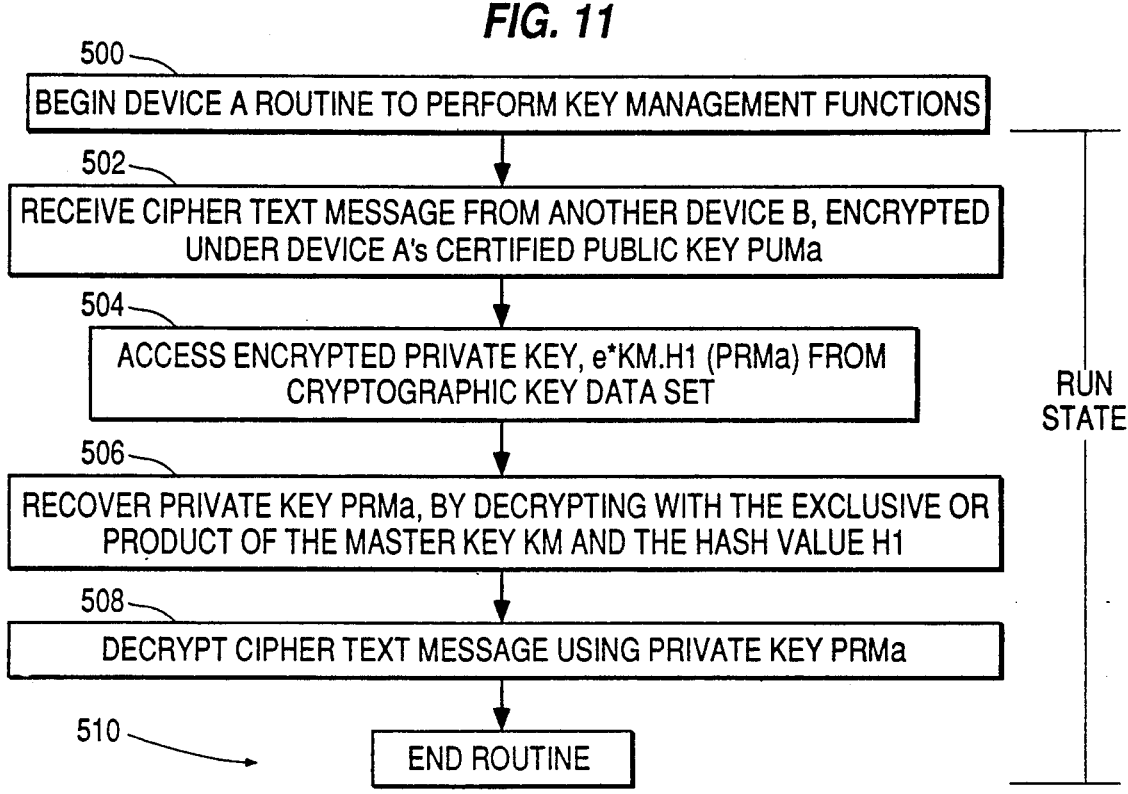
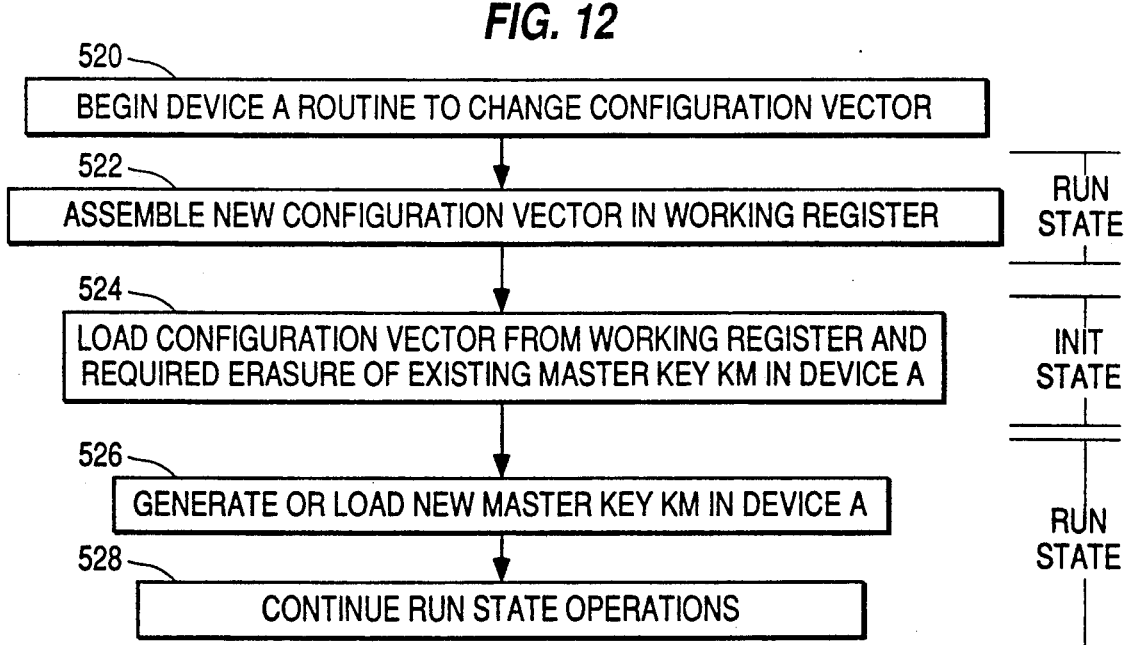

METHOD TO ESTABLISH AND ENFORCE A NETWORK CRYPTOGRAPHIC SECURITY POLICY IN A PUBLIC KEY CRYPTOSYSTEM

BACKGROUND OF THE INVENTION

1. Technical Field

The invention disclosed broadly relates to data processing systems and methods and more particularly relates to cryptographic systems and methods for use in data processing systems to enhance security.

2. Background Art

The following patents and patent applications are related to this invention and are incorporated herein by reference:

B. Brachtl, et al., "Controlled Use of Cryptographic Keys Via Generating Stations Established Control Values," U.S. Pat. No. 4,850,017, issued Jul. 18, 1989, assigned to IBM Corporation and incorporated herein by reference.

S. M. Matyas, et al., "Secure Management of Keys Using Control Vectors," U.S. Pat. No. 4,941,176, issued Jul. 10, 1990, assigned to IBM Corporation and incorporated herein by reference.

S. M. Matyas, et al., "Data Cryptography Operations Using Control Vectors," U.S. Pat. No. 4,918,728, issued Apr. 17, 1990, assigned to IBM Corporation and incorporated herein by reference.

S. M. Matyas, et al., "Personal Identification Number Processing Using Control Vectors," U.S. Pat. No. 4,924,514, issued May 8, 1990, assigned to IBM Corporation and incorporated herein by reference.

S. M. Matyas, et al., "Secure Management of Keys Using Extended Control Vectors," U.S. Pat. No. 4,924,515, issued May 8, 1990, assigned to IBM Corporation and incorporated herein by reference.

S. M. Matyas, et al., "Secure Key Management Using Control Vector Translation," U.S. Pat. No. 4,993,069, issued Feb. 12, 1991, assigned to IBM Corporation and incorporated herein by reference.

S. M. Matyas, et al., "Secure Key Management Using Programmable Control Vector Checking," U.S. Pat. No. 5,007,089, issued Apr. 9, 1991, assigned to IBM Corporation and incorporated herein by reference.

B. Brachtl, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

D. Abraham, et al., "Smart Card Having External Programming Capability and Method of Making Same," Ser. No. 004,501, filed Jan. 19, 1987, assigned to IBM Corporation and incorporated herein by reference.

S. M. Matyas, "Technique for Reducing RSA Crypto Variable Storage", U.S. Pat. No. 4,736,423, issued Apr. 5, 1988, assigned to IBM Corporation and incorporated herein by reference.

S. M. Matyas, et al., "Secure Management of Keys Using Control Vectors with Multi-Path Checking," Ser. No. 07/596,637, filed Oct. 12, 1990, assigned to IBM Corporation and incorporated here by reference.

S. M. Matyas, et al., "Secure Cryptographic Operations Using Alternate Modes of Control Vector Enforcement," Ser. No. 07/574,012, filed Aug. 22, 1990, assigned to IBM Corporation and incorporated here by reference.

S. M. Matyas, et al., "Method and Apparatus for Controlling the Use of a Public Key, Based on the Level of Import Integrity for the Key," Ser. No. 07/602,989, filed Oct. 24, 1990, assigned to IBM Corporation and incorporated herein by reference.

S. M. Matyas, et al., "A Hybrid Public Key Algorithm/Data Encryption Algorithm Key Distribution Method Based on Control Vectors," Ser. No. 07/748,407, filed Aug. 22, 1991, assigned to IBM Corporation and incorporated herein by reference.

S. M. Matyas, et al., "Generating Public and Private Key Pairs Using a Passphrase," Ser. No. 07/766,533, filed Sep. 27, 1991, assigned to IBM Corporation and incorporated herein by reference.

S. M. Matyas, et al., "Public Key Cryptosystem Key Management Based on Control Vectors," Ser. No. 07/766,260, filed Sep. 27, 1991, assigned to IBM Corporation and incorporated herein by reference.

The cryptographic architecture described in the cited patents by S. M. Matyas, et al. is based on associating with a cryptographic key, a control vector which provides the authorization for the uses of the key intended by the originator of the key. The cryptographic architecture described in the cited patents by S. M. Matyas, et al. is based on the Data Encryption Algorithm (DEA), see American National Standard X3.92-1981, Data Encryption Algorithm, American National Standards Institute, New York (Dec. 31, 1981), whereas the present invention is based on both a secret key algorithm, such as the DEA, and a public key algorithm. Various key management functions, data cryptography functions, and other data processing functions are possible using control vectors, in accordance with the invention. A system administrator can exercise flexibility in the implementation of his security policy by selecting appropriate control vectors in accordance with the invention. A cryptographic facility (CF) in the cryptographic architecture is described in the above cited patents by S. M. Matyas, et al. The CF is an instruction processor for a set of cryptographic instructions, implementing encryption methods and key generation methods. A memory in the cryptographic facility stores a set of internal cryptographic variables. Each cryptographic instruction is described in terms of a sequence of processing steps required to transform a set of input parameters to a set of output parameters. A cryptographic facility application program (CFAP) is also described in the referenced patents and patent applications, which defines an invocation method, as a calling sequence, for each cryptographic instruction consisting of an instruction mnemonic and an address with corresponding input and output parameters.

Public key encryption algorithms are described in a paper by W. Diffie and M. E. Hellman entitled "Privacy and Authentication: An Introduction to Cryptography," *Proceedings of the IEEE*. Volume 67, No. 3, March 1979, pp. 397-427. Public key systems are based on dispensing with the secret key distribution channel, as long as the network has a sufficient level of integrity. In a public key cryptographic system, two keys are used, one for enciphering and one for deciphering. Public key algorithm systems are designed so that it is easy to generate a random pair of inverse keys a public key PU for enciphering and a private key PR for deciphering, and it is easy to operate with PU and PR, but is computationally infeasible to compute PR from PU. Each user generates a pair of inverse transforms, PU and PR. He keeps the deciphering transformation PR secret, and makes the enciphering transformation PU public by placing it in a public directory. Anyone can now encrypt messages and send them to the user, but no one else can decipher messages intended for him. It is possible, and often desirable, to encipher with PU and decipher with PR. For this reason, PU is usually referred to as a public key and PR is usually referred to as a private key.

One important feature of a public key cryptographic system is that it provides an improved method of key distribution, particularly in the case of a hybrid cryptographic system where it is desired to distribute DEA keys using the public key cryptographic system. To implement this key distribution feature, each user A, B, etc., has an associated public and private key pair (PUa,PRa), (PUb,PRb), etc. Any user, say B, who wishes to distribute a DEA key K to user A, merely encrypts K with PUa, the public key of A. Since only A has PRa, the private key of A, only A can decrypt and recover K. This ensures that only A (who has PRa) and the sender (who used PUa) have a copy of K. However, to make this protocol secure, it is necessary for the sender to prove his or her identity to A. That is, if B is the sender, then B must prove his or her identity to A. Only then will A be sure that the key originated with B. (Note that B is already sure that only A can recover the key.) The means to accomplish this is for B to "sign" K or the encrypted key ePUa(K) or the message, with his or her private key PRb. Messages are signed using a cryptographic variable called a digital signature, as explained below. A method for distributing DEA keys using a public key algorithm is taught in co-pending patent application Ser. No. 07/748,407, cited in the Background Art.

A corollary feature of public key cryptographic systems is the provision of a digital signature which uniquely identifies the sender of a message. If user A wishes to send a signed message M to user B, he operates on it with his private key PR to produce the signed message S. PR was used as A's deciphering key when privacy was desired, but it is now used as his "enciphering" key. When user B receives the message S, he can recover the message M by operating on the ciphertext S with A's public PU. By successfully decrypting A's message, the receiver B has conclusive proof it came from the sender A. Digital signatures can be produced either by decrypting the data to be signed with the private key, which works well when the data is short, or by first hashing the data with a strong one-way cryptographic function and decrypting the so-produced hashed value with the private key. Either method will work. Thus, in the above described method of DEA key distribution, B sends A two quantities: (1) the encrypted key, ePU(K), and (2) a digital signature e.g., of the form (a) dPR(ePU(K)) or dPR(hash(ePU(K))). A method for producing digital signatures based on the hash of the data to be signed is taught in co-pending patent application Ser. No. 07/748,407, cited in the Background Art. Examples of public key cryptography are provided in the following U.S. patents: U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method." The signature is prepared by operating on it with the private key PR. Although this operation is referred to as "encrypting" herein, since PR is secret, some writers describe this operation as "decrypting."

In the above example of DEA key distribution, where B sends A a DEA key K, the method is secure only if A can be sure that K has in fact originated from the party so stated (i.e., K originated from the party who has signed K or ePUa(K) or the message). Suppose that B signs K or hash(K), not ePUa(K) or hash(ePUa(K)), i.e., the signature is of the form dPRb(K) or dPRb(hash(K)). Suppose that the signature is of the form dPRb(hash(K)), so that inverting dPRb(hash(K)) with PUb to recover hash(K) does not reveal the value of K. Now, if an adversary with public and private key pair (PUx,PRx) could substitute PUx for PUa, thus causing B to encrypt K with PUx instead of PUa, then the adversary could defeat security by (1) intercepting ePUx(K) and dPRb(hash(K)), (2) decrypting ePUx(K) with PRx, (3) re-encrypting K with PUa to produce ePUa(K), and (4) sending ePUa(K) and dPRb(hash(K)) to A. In this case, A and B are unaware that the adversary has had a peek at K. If B instead signs ePUa(K) or the hash of ePUa(K), then the attack still works, but is a bit more complicated. However, if an adversary with public and private key pair (PUx,PRx) could substitute PUx for PUa and PUx for PUb, thus causing B to encrypt K with PUx instead of PUa and could cause B to validate the signature dPRx(ePUa(K)) with PUx instead of PUb, then then adversary could defeat security by (1) intercepting ePUx(K) and dPRb(hash(ePUx(K))), (2) decrypting ePUx(K) with PRx, (3) re-encrypting K with PUa to produce ePUa(K), (4) hashing ePUa(K) to form hash(ePUa(K)), (5) decrypting hash(ePUa(K)) with PRx to form digital signature dPRx(hash(ePUa(K))), and (6) sending ePUa(K) and dPRx(hash(ePUa(K))) to A. In this case, A validates dPRx(hash(ePUa(K))) with PUx and thus believes that ePUa(K) originates with B. A and B are unaware that the adversary has had a peek at K.

The methods of attack outlined above are thwarted by ensuring that A has a valid copy of PUb and that B has a valid copy of PUa. The common method for accomplishing this is to use a certification center which permits public keys to be registered with the certification center. The process works like this. A party, say A, produces a key pair (PUa,PRa). PUa is included in a message, often called a certificate. The certificate contains a public key and key-related data such as an identifier of the party creating and registering the key, in this case, party A, a key name, a start and end date and time when the key is active, etc. The certification center also has a key pair (PUcert,PRcert), where PUcert is distributed with integrity, in advance, to each of the other parties in the network serviced by the certification center, i.e., to A, B, C, etc. After the certification center is satisfied that a request for public key registration is "okay" (e.g., that party A is in fact the actual party to whom the to-be-registered public key belongs), then the certification center signs the certificate with its private key PRcert, i.e., the cryptographic quantity dPRcert(hash(certificate)) is produced, and the certificate and digital signature are returned to party A or stored in a central directory. Thereafter, the certificate and digital signature can be used as proof that PUa belongs to party A. For example, party B obtains the certificate and digital signature from party A or from the central directory and validates the signature with PUcert, the public key of the certification center. This proves to B that PUa belongs to A. In like manner, A can obtain and authenticate a digital signature and certificate containing B's public key PUb. This completely thwarts the above attacks wherein an adversary substitutes one public key for another, thereby causing A to use PUx instead of PUb and causing B to use PUx instead of PUa.

In most cryptographic systems, the keys belonging to a cryptographic device are encrypted with a single master key and stored in a cryptographic key data set. The master key is stored in clear form within the cryptographic hardware. The concept of using a single master key to encrypt keys stored in a cryptographic key data set is known as the master key concept. In order to electronically distribute keys from one device to another, e.g., to distribute a data-encrypting key as part of session initiation, each pair of devices shares a unique key-encrypting key under which all distributed keys are encrypted. Thus, a data-encrypting key encrypts many messages. A key-encrypting key encrypts many electronically distributed data-encrypting keys, and so forth. A master key encrypts many key-encrypting and data-encrypting keys stored in a particular system's cryptographic key data set. Key management design principles are discussed in a paper by S. M. Matyas, et al. entitled "A Key-Management Scheme Based on Control Vectors," IBM Systems Journal, Volume 30, No. 2, 1991, pp. 175-191.

Most cryptographic systems make use of many different types of keys, so that information encrypted with a key of one type is not affected by using a key of another type. A key is assigned a type on the basis of the information the key encrypts or the use being made of the key. For example, a data-encrypting key encrypts data. A key-encrypting key encrypts keys. A PIN-encrypting key encrypts personal identification numbers (PINs) used in electronic funds transfer and point-of-sale applications. A MAC key is used to generate and authenticate message authentication codes (MACs).

At the time a key is generated, the user or user application determines, from among the range of options permitted by the key management, the form of each generated key. For example, a generated key can be produced (1) in clear form, (2) in encrypted form suitable for storage in a cryptographic key data set, or (3) in encrypted form suitable for distribution to a designated receiving device. Generally, cryptographic systems have different options for generating keys in these different forms. Key types also include a device key pair used for backup and recovery purposes. Also, at the time a key is generated, the user or user application determines, from among the range of options permitted by the key management, the type and usage of each generated key. Type and usage information are examples of a class of key-related information called control information. For example, in U.S. Pat. Nos. 4,850,017, 4,941,176, 4,918,728, 4,924,514, 4,924,515, and 5,007,089, the control information is embodied within a data variable called the control vector. The control vector concepts taught in these U.S. Patents are summarized in a paper by S. M. Matyas entitled "Key Handling With Control Vectors," IBM Systems Journal, Volume 30, No. 2, 1991, pp. 151-174. In the case of the device key pair, the control information associated with the PU and PR keys is also stored with the keys within the CF, where its integrity is ensured.

In order for a DEA-based cryptographic system to be made operable, each device must first be initialized with a master key and at least one key-encrypting key. The master key permits keys stored in the cryptographic key data set to be encrypted, and the key-encrypting key establishes a key-distribution channel with at least one other network device. When key distribution is performed in a peer-to-peer environment, each device is initialized with a key-encrypting key for each other device with which it wishes to communicate. However, when key distribution is performed with the assistance of a key-distribution center (KDC) or key-translation center (KTC), each device is initialized with only one key-encrypting key shared with the KDC or KTC. Thereafter, additional key-encrypting keys are distributed electronically and initialized automatically using the KDC or KTC. The key-distribution channel can also be made unidirectional. That is, one key-encrypting key encrypts keys transmitted from a first device to a second device and another key-encrypting key encrypts keys transmitted in the other direction. As stated above, each cryptographic device is initialized with at least one key-encrypting key. Consider the process of installing keys between two devices A and B, where one device, say A, generates a key-encrypting key for installation at both A and B. At device A, a clear key-encrypting key KK is randomly generated, e.g., by coin tossing. The clear KK is then manually loaded into the cryptographic hardware where it is encrypted under the A's master key, or a variant key formed as the Exclusive-OR product of the master key and a control vector. The encrypted value of KK is then stored in A's cryptographic key data set. The clear value of KK is then transported to device B, e.g., using a courier. At device B, KK is manually loaded into the cryptographic hardware where it is encrypted under B's master key, or a variant key formed as the Exclusive-OR product of the master key and a control vector. The encrypted value of KK is then stored in B's cryptographic key data set. The encrypted copies of KK at A and B enable A and B to communicate cryptographically as described in U.S. Pat. No. 4,941,176. U.S. Pat. No. 4,941,176 also provides for the initial key-encrypting key KK to be defined as the Exclusive-OR product of two or more key parts. At device A, each key part is manually loaded into the cryptographic hardware. The separately entered key parts are combined within the hardware to form the final value of KK. Each key part can be transported to the receiving cryptographic device using a separate courier. At device B, each key part is manually loaded into the cryptographic hardware and combined to form the final value of KK.

In a hybrid cryptographic system, the key management is designed so that DEA keys are distributed under the encryption of a public key. That is, B distributes a key to A by encrypting the key under PUa, A's public key. A recovers the key by decrypting the received encrypted key with PRa, A's private key, as described above. Thus, the key-encrypting key or keys manually installed into the cryptographic devices of a DEA-based cryptographic system can now be electronically distributed using a public key algorithm.

Instead of manually installing a public and private key pair (PU,PR) at each device, (PU,PR) is generated inside the cryptographic device. The private key, PR, is stored within the cryptographic hardware or it is encrypted under a master key and stored in a cryptographic key data set. If the public key is to be used for key distribution purposes, then its integrity within the cryptographic network can be assured by registering it at a certification center and receiving a certificate and digital signature, as described above. This allows the cryptographic device to freely distribute the public key to other devices with the assurance that the other devices will accept the public key as genuine. Thus, the keys used with the public key algorithm are handled automatically using electronic means; there is no requirement for manual installation of these keys at the cryptographic devices within the network.

In some cases, the public and private keys belonging to a cryptographic device may be stored in clear form within the cryptographic hardware. As an alternative to this approach, keys may be stored outside the cryptographic hardware, e.g., encrypting the public and private keys with the master key, or a variant key derived from the master key, and storing them in key tokens together with other key-related data (i.e., a control vector), as described in co-pending patent application Ser. No. 07/766,260 entitled "Public Key Cryptosystem Key Management Based on Control Vectors." Thus, the prior art describes how, in a hybrid cryptographic system using a public key algorithm, to eliminate (1) couriers and (2) manual entry of clear key-encrypting keys. While this is an improvement over a DEA-based cryptographic system, the prior art does not teach how to eliminate a requirement for manual entry of clear keys altogether. Except in special situations, each cryptographic device will need several, and perhaps many, key pairs to perform the tasks of key management and data management. And, the most practical means for doing this is to make use of a system master key under which, at least, the private keys of the public key algorithm are encrypted for storage in a cryptographic key data set. It is also argued in co-pending patent application Ser. No. 07/766,260 that it is sometimes advantageous to encrypt the public keys for storage in a cryptographic key data set, even though this is not done to keep the public keys secret. Thus, it would be advantageous for the cryptographic system key management to be designed so that the need for manual entry of keys, including the master key itself, is completely eliminated. This would permit cryptographic systems to be used in places where it is impractical or infeasible for a secret master key to be manually loaded into the cryptographic device. In so doing, cryptographic systems could now be designed so that their initialization is fully automated, i.e., not requiring couriers and not requiring the manual entry of keys by humans.

Also note that if all manual entry of keys could be eliminated, this would allow a potential higher level of security to be established for the system, as no human, authorized or not, would be able to introduce known key values into the system which, if entered, would allow the possibility of off-line decryption of anything encrypted under the known quantity.

In many cryptographic systems, such as described in U.S. Pat. Nos. 4,850,017, 4,941,176, 4,918,728, 4,924,514, 4,924,515, and 5,007,089, and co-pending patent application Ser. No. 07/766,260, the cryptographic hardware is initialized with configuration data as well as other cryptographic variables, including keys, such as the master key. The configuration data personalizes a device, e.g., uniquely identifies a device and restricts the processing options that the device is permitted to perform, including the possibility of crippling the ability to manually enter keys.

As was discussed above, the conventional operation of a network using a certification center enables each recipient of a certified public key PUMa from device A, for example, to be assured of the genuineness of that key. The certificate and digital signature dSigPRC issued by the certification center on that key PUMa can be used by device B, for example, as proof that the key PUMa belongs to device A. Device B merely decodes the digital signature dSigPRC with its copy of the certification center's public key PUC, to validate PUMa. Device B is then sure that when he encrypts his secret messages under device A's certified public key PUMa, that key belongs to device A. Device A then decodes the encrypted message using device A's private key PRMa. However, there is no assurance that device A's private key PRMa has not been compromised. Device A's security practices may have become lax either prior to or after the event of certification of PUMa by the certification center. Device B may be entrusting its valuable secret information to device A's compromised system, enabling an adversary to discover device B's information. Any network security policy initially established and implemented by configuration data loaded into member devices in a network, can be deviated from by one device in the network, thereby compromising the secret information transmitted to that deviant device by other devices in the network.

The prior art has not provided an adequate means to require member devices in a network to be constrained to continue faithfully practicing an established network security policy.

OBJECTS OF THE INVENTION

It is therefore an object of the invention to provide an improved method of key management in a public key cryptographic system.

It is another object of the invention to provide an improved method of key management in a public key cryptographic system which promulgates, implements and enforces a network security policy.

It is another object of the invention to provide an improved method of key management in a public key cryptographic system which inhibits the participation by members of a network who have deviated from compliance with an established network security policy.

It is another object of the invention to provide an improved method of key management in a public key cryptographic system, which can enforce a network security policy for diverse levels of security to be implemented among the several client devices in the network.

SUMMARY OF THE INVENTION

These and other objects, features, and advantages are accomplished by the invention disclosed herein. A network is configured so that a first data processor provides a certification center function for the network. A second data processor in the network functions as client device A, which will seek certification of its public keys by the certification center. A third data processor in the network functions as client device B, which will seek certification of its public keys by the certification center. In accordance with the invention, the certification center will encode the network security policy into a configuration vector which is transmitted to each client device A and B in the network. The network security policy may provide for diverse levels of security to be implemented among the several client devices in the network. The configuration vector received by a client device, for example client device A, is decoded and used to configure its cryptographic system so that its operations are limited so as to maintain its level of security in compliance with the network security policy dictated by the certification center.

As was discussed in the background herein, the conventional operation of a network using a certification center, enables each recipient of a certified public key PUMa from device A, for example, to be assured of the genuineness of that key, that is the certificate and digital signature dSigPRC issued by the certification center on that key PUMa can be used by device B, for example, as proof that that key PUMa belongs to device A. Device B merely decodes the digital signature dSigPRC with its copy of the certification center's public key PUC, to validate PUMa.

However, in accordance with the invention, device A, in this example, will be constrained to continue faithfully practicing the security policy dictated by the certification center, long after device A's public key PUMa has been certified. If device A alters its operations from the limits encoded in its configuration vector, for example, by loading a new configuration vector, device A will be denied participation in the network. In accordance with the invention, to accomplish this enforcement of the network security policy dictated by the certification center, it is necessary for the certification center to verify at the time device A requests certification of its public key PUMa, that device A is configured with the currently authorized configuration vector. Device A is required to transmit to the certification center a copy of device A's current configuration vector, in an audit record. The certification center then compares device A's copy of the configuration vector with the authorized configuration vector for device A stored at the certification center. If the comparison is satisfactory, then the certification center will issue the requested certificate and will produce a digital signature dSigPRC on a representation of device A's public key PUMa, using the certification center's private certification key PRC.

From that time on, device A can distribute its certified public key PUMa to other devices, such as device B, and device A can receive messages encrypted under its public key PUMa, which it can decrypt under device A's paired private key PRMa. And device A can sign its messages to other devices in the network, such as to device B, by signing with its digital signature dSigPRMa using device A's private key PRMa, and the recipient device B will validate the message by decrypting dSigPRMa using its copy of device A's certified public key PUMa.

However, in accordance with the invention, device A can have use of its private key PRMa only so long as device A adheres to the network security policy by preserving its authorized copy of the configuration vector in its cryptographic system. In accordance with the invention, if a new configuration vector replaces the authorized copy in device A's cryptographic system, then the cryptographic system automatically denies device A the use of its private key PRMa. This results in device A being incapable of signing outgoing messages with its digital signature dSigPRMa and incapable of decrypting incoming messages encrypted by the sender under device A's certified public key PUMa.

In this manner, the network security policy promulgated by the certification center is implemented and enforced.

BRIEF DESCRIPTION OF THE DRAWINGS

These and other objects, features, and advantages of the invention will be more fully appreciated with reference to the accompanying figures.

FIG. 5 illustrates a portion of the cryptographic facility environment memory in the certification center 10.

FIG. 6 is an example format for a portion of a configuration vector 161.

FIG. 10 is a flow diagram of a computer program and method executed in the certification center 10, to enforce network security policy.

FIG. 11 is a flow diagram of a computer program and method executed in device A to perform key management functions in the run state.

FIG. 12 is a flow diagram of a computer program and method executed in device A to change the configuration vector.

DESCRIPTION OF THE BEST MODE FOR CARRYING OUT THE INVENTION

Figure 1:
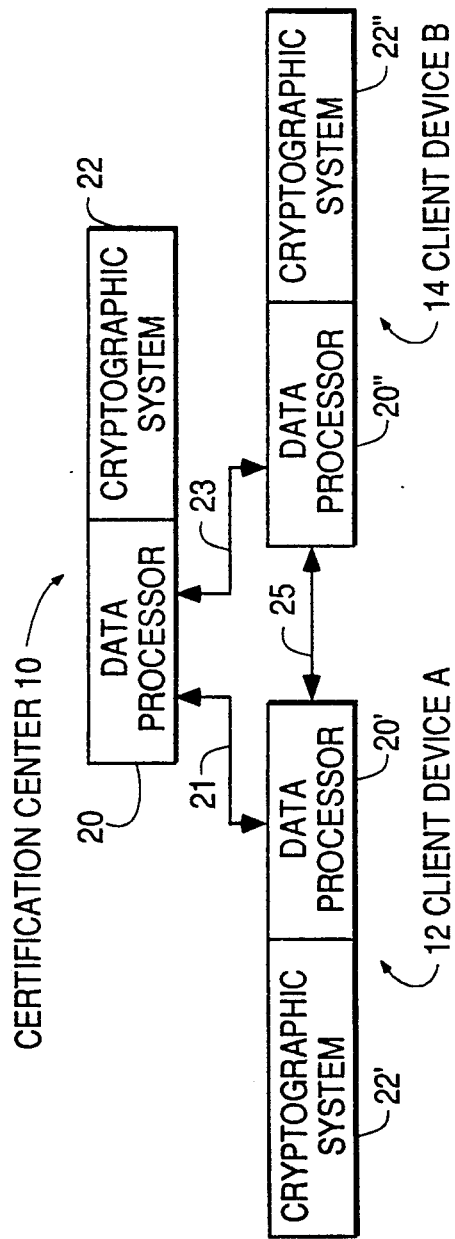
FIG. 1 illustrates a communications network including a plurality of data processors, each of which includes a cryptographic system.

FIG. 1 illustrates a network block diagram showing a communications network connecting a plurality of data processors including data processor 20, data processor 20', and data processor 20". Also included in each data processor is a cryptographic system, as shown in FIG. 1. Data processor 20 includes cryptographic system 22, data processor 20' includes cryptographic system 22' and data processor 20" includes cryptographic system 22". Each data processor supports the processing of one or more applications which require access to cryptographic services such as for the encryption, decryption and authenticating of application data and the generation and installation of cryptographic keys. The cryptographic services are provided by a secure cryptographic facility in each cryptographic system. The network provides the means for the data processors to send and receive encrypted data and keys. Various protocols, that is, formats and procedural rules, govern the exchange of cryptographic quantities between communicating data processors in order to ensure the interoperability between them.

The network of FIG. 1 is configured so that the data processor 20 provides a certification center 10 function for the network. Data processor 20' functions as client device A 12, which will seek certification of its public keys by the certification center 10 over line 21. Data processor 20" functions as client device B 14 which will seek certification of its public keys by the certification center 10 over line 23. In accordance with the invention, the certification center 10 will encode the network security policy into a configuration vector which is transmitted to each client device A and B in the network. The network security policy may provide for diverse levels of security to be implemented among the several client devices in the network. The configuration vector received by a client device, for example client device A, is decoded and used to configure its cryptographic system 22' so that its operations are limited so as to maintain its level of security in compliance with the network security policy dictated by the certification center 10.

As was discussed in the background herein, the conventional operation of a network using a certification center, such as certification center 10 in FIG. 1, enables each recipient of a certified public key PUMa from device A, for example, to be assured of the genuineness of that key. The certificate and digital signature dSigPRC issued by the certification center 10 on that key PUMa can be used by device B, for example, as proof that that key PUMa belongs to device A. Device B merely decodes the digital signature dSigPRC with his copy of the certification center's public key PUC, to validate PUMa.

However, in accordance with the invention, device A, in this example, will be constrained to continue faithfully practicing the security policy dictated by the certification center 10, long after device A's public key PUMa has been certified. If device A alters its operations from the limits encoded in its configuration vector, for example by loading a new configuration vector, device A will be denied participation in the network. In accordance with the invention, to accomplish this enforcement of the network security policy dictated by the certification center, it is necessary for the certification center to verify at the time device A requests certification of its public key PUMa, that device A is configured with the currently authorized configuration vector. Device A is required to transmit to the certification center a copy of device A's current configuration vector, in an audit record. The certification center then compares device A's copy of the configuration vector with the authorized configuration vector for device A stored at the certification center. If the comparison is satisfactory, then the certification center will issue the requested certificate and will produce a digital signature dSigPRC on a representation of device A's public key PUMa, using the certification center's private certification key PRC.

From that time on, device A can distribute its certified public key PUMa to other devices, such as device B, and device A can receive messages encrypted under its public key PUMa, which it can decrypt under device A's paired private key PRMa. And device A can sign its messages to other devices in the network, such as to device B, by signing with its digital signature dSigPRMa using device A's private key PRMa, and the recipient device B will validate the message by decrypting dSigPRMa using its copy of device A's certified public key PUMa.

However, in accordance with the invention, device A can have use of its private key PRMa only so long as device A adheres to the network security policy by preserving its authorized copy the configuration vector in its cryptographic system 22'. In accordance with the invention, if a new configuration vector replaces the authorized copy in the cryptographic system, then the cryptographic system automatically denies device A the use of its private key PRMa. This results in device A being incapable of signing outgoing messages with its digital signature dSigPRMa and incapable of decrypting incoming messages encrypted by the sender under device A's certified public key PUMa.

In this manner, the network security policy promulgated by the certification center is implemented and enforced.

Figure 2:
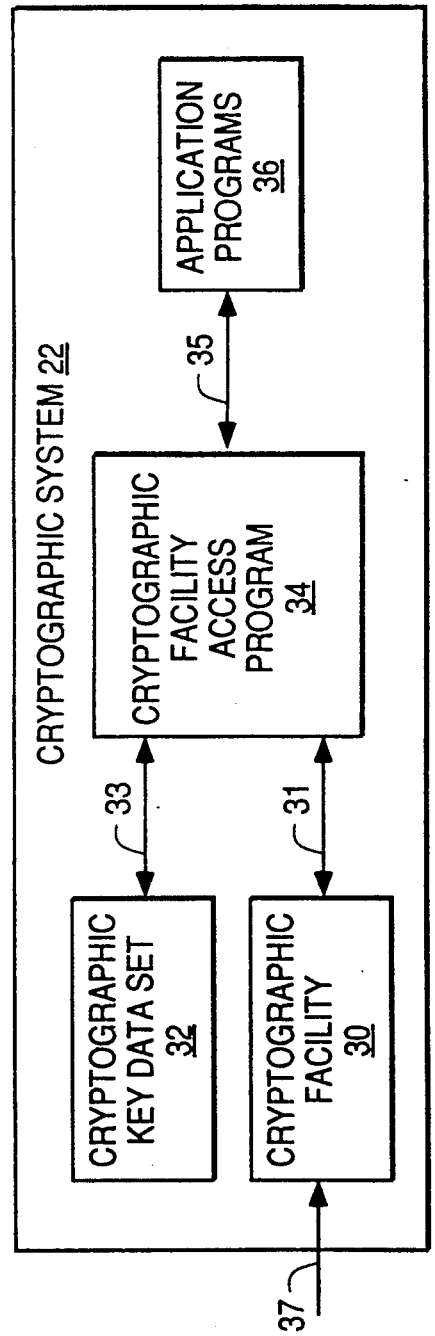
FIG. 2 is a block diagram of a cryptographic system 22.

FIG. 2 illustrates the cryptographic system 22. In the cryptographic system 22, the cryptographic facility (CF) 30 has an input 37 from a physical interface. The cryptographic facility access program (CFAP) 34 is coupled to the cryptographic facility 30 by means of the interface 31. The cryptographic key data set (CKDS) 32 is connected to the cryptographic facility access program 34 by means of the interface 33. The application programs (APPL) 36 are connected to the cryptographic facility access program 34 by means of the interface 35.

A typical request for cryptographic service is initiated by APPL 36 via a function call to the CFAP 34 at the interface 35. The service request includes key and data parameters, as well as key identifiers which the CFAP 34 uses to access encrypted keys from the CKDS 32 at the interface 33. The CFAP 34 processes the service request by issuing one or more cryptographic access instructions to the CF 30 at the interface 31. The CF 30 may also have an optional physical interface 37 for direct entry of cryptographic variables into the CF 30. Each cryptographic access instruction invoked at the interface 31 has a set of input parameters processed by the CF 30 to produce a set of output parameters returned by the CF 30 to the CFAP 34. In turn, the CFAP 34 may return output parameters to the APPL 36. The CFAP 34 may also use the output parameters and input parameters to subsequently invoke instructions. If the output parameters contain encrypted keys, then the CFAP 34, in many cases, may store these encrypted keys in the CKDS 32.

Figure 3:
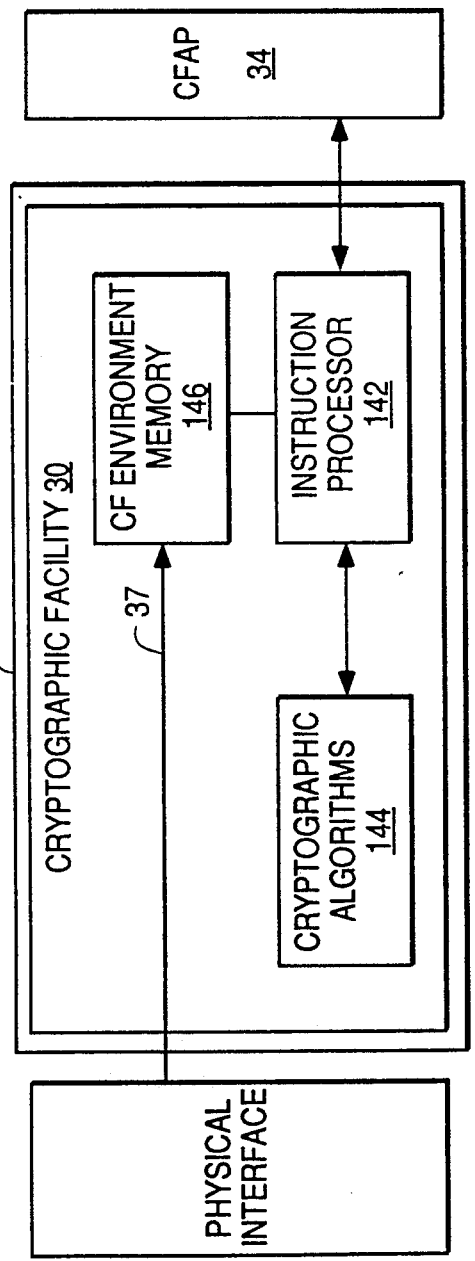
FIG. 3 is a block diagram of a cryptographic facility 30.

FIG. 3 illustrates the cryptographic facility 30. The cryptographic facility 30 is maintained within a secure boundary 140. The cryptographic facility 30 includes the instruction processor 142 which is coupled to the cryptographic algorithms 144 which are embodied as executable code. The cryptographic facility environment memory 146 is coupled to the instruction processor 142. The physical interface can be coupled over line 37 to the CF environment memory 146, as shown in the figure. The instruction processor 142 is coupled to the cryptographic facility access program (CFAP) 34 by means of the interface at 31.

The instruction processor 142 is a functional element which executes cryptographic microinstructions invoked by the CFAP access instruction at the interface 31. For each access instruction, the interface 31 first defines an instruction mnemonic or operation code used to select particular microinstructions for execution. Secondly, a set of input parameters is passed from the CFAP 34 to the CF 30. Thirdly, a set of output parameters is returned by the CF 30 to the CFAP 34. The instruction processor 142 executes the selected instruction by performing an instruction specific sequence of cryptographic processing steps embodied as microinstructions stored in cryptographic microinstruction memory 144. The control flow and subsequent output of the cryptographic processing steps depend on the values of the input parameters and the contents of the CF environment memory 146. The CF environment memory 146 consists of a set of cryptographic variables, for example keys, flags, counters, CF configuration data, etc., which are collectively stored within the CF 30. The CF environment variables in memory 146 are initialized via the interface 31, that is by execution of certain CF microinstructions which read input parameters and load them into the CF environment memory 146. Alternately, initialization can be done via an optional physical interface which permits cryptographic variables to be loaded directly into the CF environment memory 146, for example, via an attached key entry device.

The physical embodiment of the cryptographic facility secure boundary 140, incorporates the following physical security features. The physical embodiment resists probing by an insider adversary who has limited access to the cryptographic facility 30. The term "limited" is measured in minutes or hours as opposed to days or weeks. The adversary is constrained to a probing attack at the customer's site using limited electronic devices as opposed to a laboratory attack launched at a site under the control of the adversary using sophisticated electronic and mechanical equipment. The physical embodiment also detects attempts at physical probing or intruding, through the use of a variety of electromechanical sensing devices. Also, the physical embodiment of the cryptographic facility 30 provides for the zeroization of all internally stored secret cryptographic variables. Such zeroization is done automatically whenever an attempted probing or intrusion has been detected. The physical embodiment also provides a manual facility for a zeroization of internally stored secret cryptographic variables. Reference to the Abraham, et al. patent application cited above, will give an example of how such physical security features can be implemented.

Figure 4:
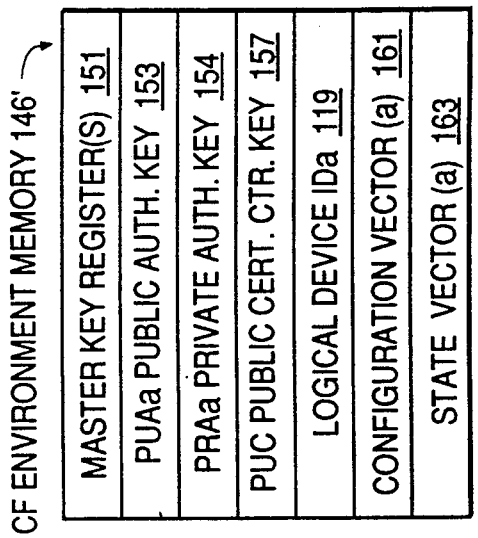
FIG. 4 illustrates a portion of the cryptographic facility environment memory in the client device A.

FIG. 4 illustrates a portion of the cryptographic facility environment memory in the client device A. The CF Environment Memory 146' in Client Device A 12 includes Master Key Register(s) 151, PUAa Public Authentication Key 153, PRAa Private Authentication Key 154, PUC Public Certification Center Key 157, Logical Device IDa 119, Configuration Vector(a) 161, and State Vector(a) 163. PRAa can also be referred to as the "private device authentication key" and PUAa can also be referred to as the "public device authentication key."

FIG. 5 illustrates a portion of the cryptographic facility environment memory in the certification center 10. The CF Environment Memory 146 in Certification Center 10 includes Master Key Register(s) 151, PUC Public Certification Center Key 157, PRC Private Certification Center Key 159, Logical Device ID 119, and table 155 which includes IDa, PUAa and Configuration Vector(a) for device A and IDb, PUAb and Configuration Vector(b) for device B.

FIG. 6 is an example format for a portion of a configuration vector 161. The Configuration Vector 161 includes a Master Key Generation Method Definition, a Cryptographic Instructions Definition Bit Mask, a Key Management Protocol Definition, a CF Backup Protocol Definition, and Other Crypto Facility Definitions. The configuration vector is a collection of encoded fields that limit or restrict the operation of the cryptographic facility. The configuration vector is set to a default value via execution of the Enter Initialization State (EIS) instruction, or it may be set to an installation-specified value via execution of the Load Configuration Vector (LCV) instruction. Details of the configuration vector, the EIS instruction and the LCV instruction are described in the copending patent application by S. M. Matyas, et al., "Public Key Cryptosystem Key Management Based on Control Vectors," Ser. No. 07/766,260, filed Sep. 27, 1991, assigned to IBM Corporation and incorporated herein by reference.

The Load Configuration Vector (LCV) instruction permits a 64 byte configuration vector to be loaded and stored within the CF Environment. Execution of the LCV instruction causes the LCV FLAG to be set to the "full" state. The LCV instruction executes only when the LCV FLAG is in the "empty" state. The LCV FLAG can only be reset to the "empty" state via execution of an EPS or EIS instruction. In effect, the LCV FLAG controls LCV execution as follows: (a) If the LCV FLAG = "empty" state, then LCV instruction execution is enabled for one execution only, whereas (b) if the LCV FLAG = "full" state, then LCV instruction execution is disabled. Execution of the EIS instruction causes a configuration vector in the CF Environment to be initialized/reinitialized to a "default" value. This value can be changed by executing an LCV instruction. The LCV instruction executes only in the "init" state.

For reasons of security, the LCV instruction is architected such that the configuration vector value stored in the CF Environment cannot be changed without erasing or invalidating the contents of the master key KM register 151. In an alternate embodiment, the private authentication key PRAa 154 or the private key PRMa can be erased or invalidated in response to executing the LCV instruction.

The Enter Init State (EIS) instruction loads a "default" configuration vector into the CF environment and resets certain flags in the state vector to change the state of the CF and to clear certain registers and buffers. More particularly, the Enter Init State instruction causes the flags controlling the old, current, and new master key registers to be reset to the "empty" state, thereby causing these keys to be invalid. It causes the LCV FLAG to be reset to the "empty" state, thereby enabling execution of the LCV instruction. It causes the CF STATE to be reset to the "init" state. The EIS instruction can be executed in the "preinit," "init," and "run" states.

The Enter Preinit State (EPS) instruction resets the CF STATE to the "preinit" state; it resets the configuration and state vectors to zero and it executes algorithm Initialize Pseudo-random Number to (further) initialize the pseudorandom number generator.

Figure 7:
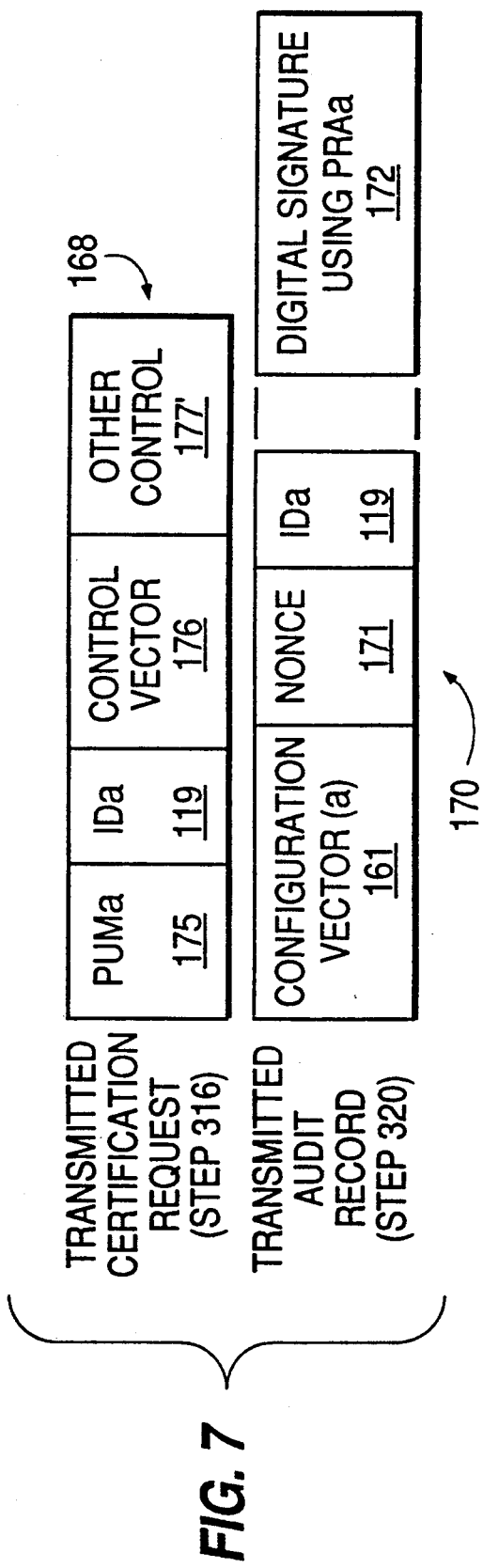
FIG. 7 is an example of the information transmitted from device A to the certification center, requesting certification of public key PUMa.

FIG. 7 is an example of the information transmitted from device A to the certification center, requesting certification of public key PUMa. In the preferred embodiment shown in FIG. 7, the information is transmitted from device A to the certification center in two messages, the request 168 and the audit record 170 with its digital signature 172. In step 316 of the flow diagram of FIG. 9, the certification request 168 is transmitted, which includes the public key PUMa 175, the identification of device A 119, a control vector 176 for PUMa, and other control information 177'. The other control information 177' may optionally include an indication of the level of security of device A, as represented by the configuration vector 161 stored at device A. In step 320 of the flow diagram of FIG. 9, the audit record 170 and its digital signature 172 are transmitted. Device A's digital signature dSigPRAa 172 on the audit record 170 uses device A's private authentication key PRAa. The audit record 170 includes the configuration vector 161 copied from the CF environment memory 146' of device A, a random number nonce 171 sent from the certification center, and the identification IDa 119 of device A. This information can be referred to as the argument of the audit record. Accompanying the audit record is the digital signature dSigPRAa of a representation of the argument of the audit record, computed using the private authentication key PRAa of device A. The representation of the argument upon which the digital signature is computed can be the entire argument or it can be a hash value of the entire argument. Digital signatures are computed using the Generate Digital Signature (GDS) instruction. Details of the Generate Digital Signature (GDS) instruction, the Crypto Facility Audit Record (CFAR) 170 and the Export Crypto Facility Audit Record (ECFAR) instruction are described in the copending patent application by S. M. Matyas, et al., "Public Key Cryptosystem Key Management Based on Control Vectors," Ser. No. 07/766,260, filed Sep. 27, 1991, assigned to IBM Corporation and incorporated herein by reference.

The Crypto Facility Audit Record (CFAR) 170 contains the nonsecret part of the CF Environment plus additional nonsecret information. The CFAR is designed to be a multiple of 8 bytes. The Crypto Facility Audit Record 170 includes a header and a nonsecret part. The Header (H) contains information necessary to parse the CFAR. It also contains a random number (RN) field and a date and time (DT) field. The Header is 64 bytes in length. The Nonsecret Part (NSP) contains the nonsecret part of the CF Environment. NSP is variable length, but must be a whole number of bytes. The NSP in the CFAR is not the same as the NSP in the CFER (Crypto Facility Environment Record).

RN is an eight byte CFAP-supplied time-variant parameter. This field is set by the ECFAR instruction only when process-mode=1 or process-mode=2. This field is intended to be used as a nonce in a request/response protocol to guarantee freshness of the Audit record. The Certification Center generates a random number and sends it to the device to be audited in the Request-for-Audit message. The device then supplies this random number to the Export Cryptographic Facility Audit Record (ECFAR) instruction. This results in the signed Audit record being sent to the Certification Center by the Audited device with the correct nonce. The Certification Center is assured that the Audit record is current.

The Nonsecret Part includes the following: the device ID, the Nonsecret Part of CF Environment, the Configuration Vector, the State Vector, and the contents of Registers, and Tables. No encrypted information in the CFER ever appears in the clear in the CFAR.

The Export Crypto Facility Audit Record instruction constructs a Crypto Facility Audit Record (CFAR) and returns it to the CFAP. The CFAR contains (1) a copy of the nonsecret part of the CF Environment, a date and time (DT) supplied by the CF, and (3) for process-mode=1 and process-mode=2, a CFAP-supplied time-variant value RN. RN can be a random number, sequence number, or time stamp, which may be used by a designated receiving device to ensure that a produced CFAR is current. A process-mode parameter specifies to the instruction whether a digital signature is generated on the CFAR and, if so, then whether the private key is (1) PRA or (2) a PR supplied to the ECFAR instruction. A hash-rule parameter indicates to the ECFAR instruction the hash algorithm to be used in generating the digital signature. Process-mode=1 can only be executed when the GDAK FLAG is in the "full" state. Process-mode=2 can only be executed when the CKMP FLAG is in the "full" state. The Export Crypto Facility Audit Record instruction executes in the "preinit," "init," and "run" states.

In the preferred embodiment of the invention, the request made by device A for certification of its public key PUMa is done by sending PUMa 175, IDa 119, the control vector CV 176, and other information 177' with the request 168 in a first transmission to the certification center, this transmission being followed by the return of a random number nonce 171 from the certification center, which is then followed by a second transmission from device A of the audit record 170 and its digital signature 172. In an alternate embodiment of the invention, a single transmission can take place from device A to the certification center, sending PUMa 175, control vector CV 176, configuration vector 161, IDa 119 and other information 177', accompanied by a digital signature dSigPRAa of a representation of this argument using the private authentication key PRAa of device A.

Figure 8:
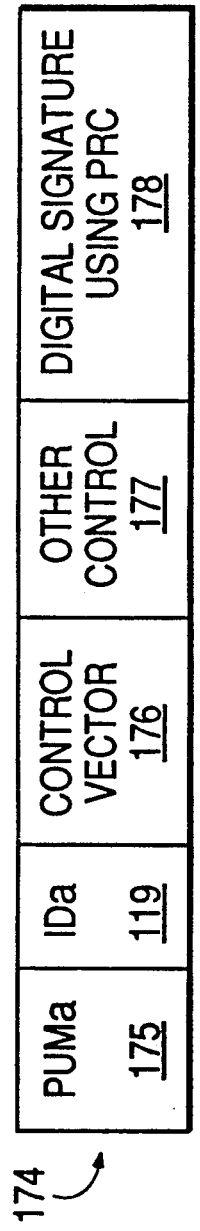
FIG. 8 is an example of a public key certificate for PUMa, accompanied by the certification center's digital signature dSigPRC using the certification center's private certification key PRC.

FIG. 8 is an example of a public key certificate for PUMa, accompanied by the certification center's digital signature dSigPRC using the certification center's private certification key PRC. The PUMa certificate 174 includes the public key PUMa 175 of device A which has been certified, the identification IDa 119 of the device A, the control vector 176 for PUMa, and other control information 177, which can include an indication of the level of security for device A, as verified by the certification center when it inspects device A's configuration vector 161. This information can be referred to as the argument of the certificate. Also included as a part of the certificate is the digital signature dSigPRC 178 of a representation of the argument of the certificate, computed using the private certification key PRC of the certification center. The representation of the argument upon which the digital signature is computed can be the entire argument or it can be a hash value of the entire argument. Digital signatures are computed using the Generate Digital Signature (GDS) instruction. Details of the Generate Digital Signature (GDS) instruction are described in the copending patent application by S. M. Matyas, et al., "Public Key Cryptosystem Key Management Based on Control Vectors," Ser. No. 07/766,260, filed Sep. 27, 1991, assigned to IBM Corporation and incorporated herein by reference. The other control information 177' in request 168 of FIG. 7 is not necessarily the same as the other control information 177 in the certificate 174 of FIG. 8.

The Generate Digital Signature instruction generates a digital signature, called dsig, from a Crypto Facility System Signature Record (CFSSR) in accordance with Section 6 of ISO DIS 9796. The CFSSR is a CF-generated record containing a 128-bit hash value calculated on a variable length input data record, called data. The length of CFSSR must be less than or equal to 1/2 the modulus length of the public key algorithm. The process of producing dSig from CFSSR consists of pre-processing steps, decryption with a private key, and post-processing steps. A PR-mode parameter specifies to the GDS instruction whether the PR key used to produce the system signature is specified in IKU1 (PR-mode=0) or whether the PR key used to produce the system signature is the PRA key stored in the CF (PR-mode=1). A private certification key can be specified to the GDS instruction only when the device is configured as a certification center (CERTIFICATION field in the configuration vector is B'1'). A private authentication key, a private key management key, or a private user key can be specified to the GDS instruction only when the device is configured as an interchange device (INTERCHANGE field in the configuration vector is B'1'). A device may act as both a certification center and an interchange device. The GDS instruction executes only in the "run" state.

Figure 9:
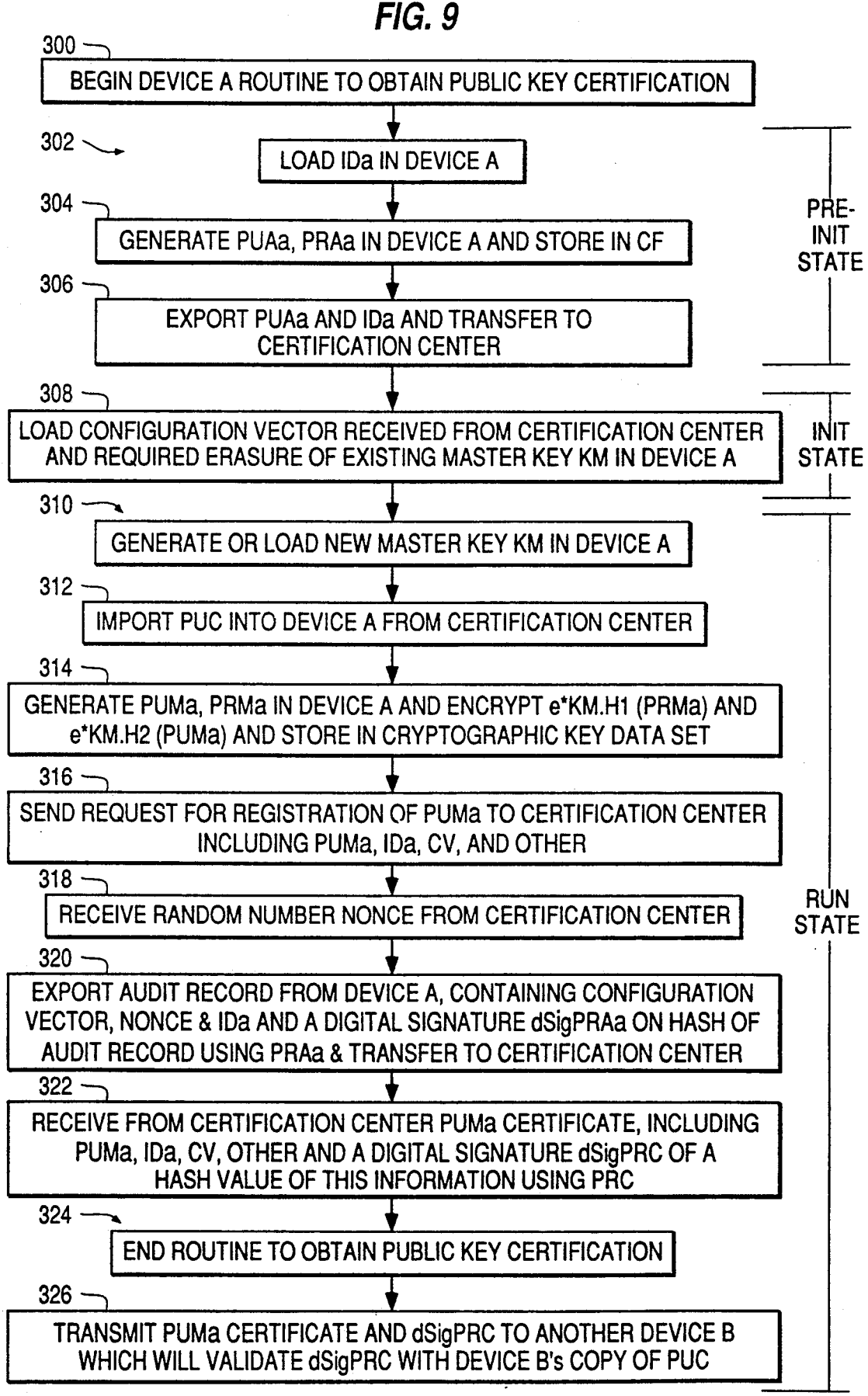
FIG. 9 is a flow diagram of a computer program and method executed in device A to obtain public key certification.

FIG. 9 is a flow diagram of a computer program and method executed in device A to obtain public key certification. In FIG. 9, step 300 Begins the Device A Routine to Obtain Public Key Certification.

Step 302 begins the pre-init state and Loads IDa in Device A. This uses the Load Physical Identifier (LPID) instruction which is described in the copending patent application by S. M. Matyas, et al., "Public Key Cryptosystem Key Management Based on Control Vectors," Ser. No. 07/766,260. filed Sep. 27, 1991, assigned to IBM Corporation and incorporated herein by reference.

The Load Physical Device ID (LPID) instruction permits a 128-bit physical identifier of a device to be loaded into the CF and stored in the DID and EID registers. Execution of the LPID instruction causes the DID flag to be set to the "full" state. The instruction executes only when the DID flag is in the "empty" state. (Note that an EPS instruction must be executed in order to reset the DID flag to the "empty" state.) The DID flag serves two purposes: (a) it controls the execution of the LPID instruction, and (b) it indicates whether the DID and EID registers have or have not been initialized. The value of PID stored in the DID register is the PID value associated with PUA and PRA (i.e., the PUA and PRA of that device). The value of PID stored in the EID register is used for two purposes: (a) it is the value stored in the EIDO field of a certificate, and thus identifies the device to another device, and (b) it is the value stored in a DEA key record, which is used by the GKSP and IDK instructions as an anti-reimport value. The 16 byte PID consists of an eight byte network part and an eight byte node part. The eight byte node part uniquely identifies the node within a network. The eight byte network part uniquely identifies the network. The objective is to arrive at a naming convention that will ensure unique PID values from one network to another. One possibility is for the eight byte network part to be registered (e.g., with a registration center). The ECFAR instruction can be used by CFAP to read the contents of the DID and EID registers. For reasons of security, the LPID instruction is architected such that the DID register contents cannot be changed without erasing the contents of the PUA and PRA buffers (i.e., a different PID can't be assigned to the same key pair stored in the PUA and PRA buffers). In like manner, the ICFER instruction is architected such that the EID register contents cannot be changed without reinitializing the CKMP register with a new key. Otherwise, use of the EID buffer as an anti-reimport value would be ineffective. The LPID instruction executes only in the "preinit" state.

Step 304 of FIG. 9 Generates public and private authentication keys PUAa,PRAa in Device A and Stores them in the cryptographic facility. This is carried out by the Generate Device Authentication Key Pair (GDAK) instruction which is described in the copending patent application by S. M. Matyas, et al., "Public Key Cryptosystem Key Management Based on Control Vectors," Ser. No. 07/766,260. filed Sep. 27, 1991, assigned to IBM Corporation and incorporated herein by reference.

The Generate Device Authentication Key Pair (GDAK) instruction generates a public and private authentication key pair, PUA and PRA. The generated keys are stored in the PUA buffer and PRA buffer in the CF, respectively, as Crypto Facility PKA Key Record 1 (CFPKR1) and Crypto Facility PKA Key Record 2 (CFPKR2). The 128-bit control vectors associated with PUA and PRA are specified to the GDAK instruction as inputs C1 and C2, respectively. The control vectors specify the public key algorithm and other algorithm related information necessary for key generation. Consistency checking is performed on control vectors C1 and C2. For example, the ALGORITHM, ALGORITHM EXTENSION, and LENGTH fields in C1 and C2 must match. Execution of the GDAK instruction causes the GDAK FLAG in the state vector to be set to the "full" state from the "empty" state. The instruction executes only when the GDAK FLAG is in the "empty" state. (Note that the EPS instruction must be executed to reset the GDAK FLAG to the "empty" state.) The GDAK FLAG serves two purposes: (a) it controls execution of the GDAK instruction, and (b) it indicates when the PUA and PRA buffers have been initialized. The GDAK instruction executes only in the "preinit" state.

Step 306 of FIG. 9 exports device A's public authentication key PUAa and IDa and Transfers them to the Certification Center. This step uses either the ECFAR instruction previously discussed, or alternately, the Export Public Key (EPUK) instruction which is described in the copending patent application by S. M. Matyas, et al., "Public Key Cryptosystem Key Management Based on Control Vectors," Ser. No. 07/766,260, filed Sep. 27, 1991, assigned to IBM Corporation and incorporated herein by reference. The certification center must be sure that PUAa belongs to device A. This can be accomplished by removing PUAa from device A while it is still at the manufacturer's facility, and then delivering PUAa to the certification center in a secure manner, for example by courier. Alternately, PUAa can be sent by device A over a link with integrity to the certification center and a later on-site physical audit can be performed to confirm that PUAa belongs to device A, this being a less secure method until the event of on-site auditing has taken place. Alternately, the device A can be delivered from the manufacturer to a third party who removes the PuAa key from the device and delivers it with integrity to the certification center.

The Export Public Key (EPUK) instruction (1) translates an Internal Key Unit containing public key PU to an External Key Unit containing PU (PU-mode=0) or (2) constructs an External Key Unit for the internally stored key PUA (PU-mode=1). The Export Public Key instruction has options for outputting the constructed External Key Unit (1) without a digital signature (PR-mode=0), (2) with a digital signature generated with a PR supplied to the Export Public Key instruction (PR-mode=2), or (3) with a digital signature generated with the internally stored key PRA (PR-mode=3). The private key PR used with PR-mode=2 can be a PRC, PRM, or PRU key. However, to generate a digital signature with private key PRC, the device must be configured as a certification center (i.e., CERTIFICATION=B'1' must be specified in the configuration vector). A hash-rule parameter indicates to the EPUK instruction the hash algorithm to be used in generating the digital signature. Control vectors C1, C3, and C4 are all associated with the PU to be exported. C1 is stored either in IKU1 (PU-mode=0) or in the PUACV register (PU-mode=1). C4 is stored in EKU3, and C3 is an intermediate value used by the CFAP to request changes to C1, as follows. When a PU is exported, the CFAP is permitted, in certain cases, to change control vector fields. If no change is desired or no change is permitted, then the CFAP sets C3=C1, else the CFAP produces C3 by making selected changes to C1. The control vector checking process assures that C3 is properly specified. Likewise, when a PU is exported the CF is permitted to change certain control vector fields. If no change is needed or prescribed, then the CF sets C4=C3; else the CF produces C4 by making selected changes to C3.

Step 308 of FIG. 9 begins the init state, loads the Configuration Vector received from the Certification Center and automatically requires the erasure of the existing master key KM in Device A. This step uses the LCV instruction described above. The LCV instruction automatically erases the existing master key KM. With no master key available, any other keys stored in device A in an encrypted form under the master key, will be unrecoverable. As a result of this step 308, the configuration vector is decoded and the cryptographic facility in device A is configured to conform to the security policy dictated by the certification center.

Step 310 of FIG. 9 begins the run state and generates or loads a new master key KM in Device A. One of the security requirements of the configuration vector is specifying how the new master key is installed in device A. For example, the manual loading of a new master key is attributed as having less security than the autonomous generation of a new master key from an internal random number generator in device A. The methods allowed for installation of the new master key in device A are dictated by the new configuration vector, which has encoded in it the security policy for the network established by the certification center.

Step 312 of FIG. 9 imports the public certification key PUC into device A from certification center. This step uses the Import Public Key (IPUK) instruction described in the copending patent application by S. M. Matyas, et al., "Public Key Cryptosystem Key Management Based on Control Vectors," Ser. No. 07/766,260, filed Sep. 27, 1991, assigned to IBM Corporation and incorporated herein by reference. PUC will be used by device A to validate the digital signature of the public key certificates device A receives from other devices, such as device B, in the network.

Step 314 of FIG. 9 generates the public and private key management keys PUMa,PRMa in Device A and encrypts them as e*KM.H1(PRMa) and e*KM.H2(PUMa) respectively, and stores them in the cryptographic key data set (CKDS). This step uses the Generate Public and Private Key Pair (GPUPR) instruction described in the copending patent application by S. M. Matyas, et al., "Public Key Cryptosystem Key Management Based on Control Vectors," Ser. No. 07/766,260, filed Sep. 27, 1991, assigned to IBM Corporation and incorporated herein by reference. H1 and H2 are hash values of the control vectors for the two keys. Alternately, PRMa and/or PUMa can be stored within the secure boundary of the cryptographic facility of device A, in which case when a new configuration vector is loaded into the cryptographic facility, PRMa and PUMa will be erased.

Step 316 of FIG. 9 sends a request 168 for registration of PUMa to certification Center including PUMa, IDa, CV, and Other control information. In the preferred embodiment of the invention, the request made by device A for certification of its public key PUMa is done by sending PUMa 175, IDa 119, the control vector CV 176, and other information 177' with the request 168 in a first transmission to the certification center. The EPUK instruction can be used for this step, as described above.

Step 318 of FIG. 9 receives the random number nonce 171 from the certification center. This number is intended to be used as a nonce in the request/response protocol to guarantee freshness of the Audit record. The Certification Center generates a random number and sends it to the device to be audited in a Request-for-Audit message.

Step 320 of FIG. 9 exports the audit record from device A, containing the configuration vector, nonce & IDa and a digital signature dSigPRAa on a hash value of the audit record using PRAa and transfers them to the certification center. The audit record 170 includes the configuration vector 161 copied from the CF environment memory 146' of device A, a random number nonce 171 sent from the certification center, and the identification IDa 119 of device A. This information can be referred to as the argument of the audit record. Accompanying the audit record is the digital signature dSigPRAa 172 of a representation of the argument of the audit record, computed using the private authentication key PRAa of device A. The representation of the argument upon which the digital signature is computed can be the entire argument or it can be a hash value of the entire argument. Digital signatures are computed using the Generate Digital Signature (GDS) instruction, described above.

Step 322 of FIG. 9 receives from certification center the PUMa certificate, including PUMa, IDa, CV, and other control information and a digital signature dSigPRC of a hash value of this information using the private certification key PRC. The PUMa certificate 174 includes the public key PUMa 175 of device A which has been certified, the identification IDa 119 of the device A, the control vector 176 for PUMa, and other control information 177, which can include an indication of the level of security for device A, as specified in its configuration vector 161. This information can be referred to as the argument of the certificate. Also included as a part of the certificate is the digital signature dSigPRC 178 of a representation of the argument of the certificate, computed using the private certification key PRC of the certification center. The representation of the argument upon which the digital signature is computed can be the entire argument or it can be a hash value of the entire argument. Digital signatures are computed using the Generate Digital Signature (GDS) instruction.

Step 324 of FIG. 9 ends the routine to obtain public key certification at device A.

Step 326 of FIG. 9 is shown to illustrate the normal use by device A of its certified public key, transmitting the PUMa certificate and its dSigPRC digital signature to another device in the network, such as device B. Device B will validate dSigPRC with device B's Copy of of the public certification key PUC. Each recipient of a certified public key PUMa from device A is assured of the genuineness of that key, that is the certificate and digital signature dSigPRC issued by the certification center 10 on that key PUMa can be used by device B, for example, as proof that that key PUMa belongs to device A. Device B decodes the digital signature dSigPRC with his copy of the certification center's public key PUC, to validate PUMa. But in accordance with the invention, device B gains the additional knowledge that device A has adhered to the network security policy dictated by the certification center. This is confirmed if device A has signed his message to device B with a digital signature such as dSigPRMa, since device A does not have the use of his private keys if the configuration vector has been changed in device A. The level of security to which device A currently complies is known to device B through the other control information 177 which is a part of the PUMa certificate 174 of FIG. 8. If the level of security to which device A currently complies is not sufficient for the purposes of device B, device B can reject the PUMa public key and not transmit its secret messages to device A until device A can demonstrate that it has complied with a sufficient security level by sending another public key certificate signed with device A's digital signature using one of device A's private keys. Validation of digital signatures is performed using the Verify Digital Signature (VDS) instruction described in the copending patent application by S. M. Matyas, et al., "Public Key Cryptosystem Key Management Based on Control Vectors," Ser. No. 07/766,260, filed Sep. 27, 1991, assigned to IBM Corporation and incorporated herein by reference.

The Verify Digital Signature (VDS) instruction verifies a system signature, called dSig, in accordance with Section 7 of ISO DIS 9796, where dSig was created from a Crypto Facility System Signature Record (CFSSR) in accordance with Section 6 of ISO DIS 9796. The CFSSR is a CF-generated record containing a 128-bit hash value calculated on a variable length input data record, called data. CFSSR is recovered from dSig by encrypting dSig with a public key, performing consistency checking on the recovered block, and discarding redundant data and extracting CFSSR. There are no restrictions on the key type of the public key that may be used with the VDS instruction. The VDS instruction executes only in the "run" state.

FIG. 10 is a flow diagram of a computer program and method executed in the certification center 10, to enforce network security policy. The steps in FIG. 10 for the certification center are complementary with the steps described above for device A in FIG. 9. Step 400 of FIG. 10 begins certification center routine to enforce network security policy.

Step 402 of FIG. 10 receives and stores the PUA 153 and ID 119 for each device. This step uses the IPUK instruction described above.

Step 404 of FIG. 10 assembles the configuration vector 161 for each device, stores and transfers it to each respective device.

Step 406 of FIG. 10 generates PUC 157 and PRC 159. This step uses the GPUPR instruction described above.

Step 408 of FIG. 10 exports PUC 157 and transfers it to each device. This step uses the EPUK instruction described above.

Step 410 of FIG. 10 receives the registration request 168 from device A, including PUMa 175, IDa 119, CV 176, and other control information 177'. This step uses the IPUK instruction described above.

Step 412 of FIG. 10 generates the random number nonce 171 and transfers it to device A.

Step 414 of FIG. 10 receives the audit record 170, including the configuration vector 161, the nonce 171 and IDa 119 and the digital signature dSigPRAa 172 generated on a hash representation of the audit record using PRAa.

Step 416 of FIG. 10 authenticates that the audit record 170 is from device A, using PUAa to decrypt dSigPRAa 172. This step uses the VDS instruction described above.

Step 418 of FIG. 10 verifies the audit record 170 by making a comparison of the original configuration vector stored in the certification center 10 with the copy of the configuration vector 161 received in the audit record 170 from device A.

In step 420 of FIG. 10, if the comparison was successful, the certification center will assemble the certificate 174, including PUMa 175, IDa 119, CV 176, Other control 177 and the digital signature dSigPRC 178 generated on a hash representation of this information using PRC 159 and will transfer it to device A. This step uses the EPUK instruction described above.

Finally, step 422 of FIG. 10 ends the routine.

FIG. 11 is a flow diagram of a computer program and method executed in device A to perform key management functions in the run state. Step 500 of FIG. 11 begins device A routine to perform key management functions.

Step 502 of FIG. 11 receives a ciphertext message from another device B, encrypted under device A's certified public key PUMa.

Step 504 of FIG. 11 accesses the previously encrypted private key, e*KM.H1(PRMa) from cryptographic key data set, stored there in step 314 of FIG. 9.

Step 506 of FIG. 11 recovers the private key PRMa, by decrypting with the exclusive OR product of the master key KM and the hash value H1.

Step 508 of FIG. 11 decrypts the ciphertext message using private key PRMa.

Step 510 of FIG. 11 ends the routine.

It should be noted that the successful decryption of the ciphertext message depends on the availability to device A of the master key KM, which must be used to recover the private key management key PRMa.

FIG. 12 is a flow diagram of a computer program and method executed in device A to change the configuration vector. Step 520 of FIG. 12 begins the device A routine to change the configuration vector.

Step 522 of FIG. 12 assembles a new configuration vector in a working register in device A. Device A is currently in the run state.

Step 524 of FIG. 12 loads the new configuration vector from the working register and, because this step requires the execution of the LCV instruction in the init state, this step performs an automatic, required erasure of the existing master key KM in device A.

Step 526 of FIG. 12 generates or loads a new master key KM' in device A, since the old master key KM has been erased in the previous step. Device A has resumed operating in the run state.

Step 528 of FIG. 12 continues run state operations.

Note that now if step 528 branches to step 500 of FIG. 11 to recover the private key management key PRMa for the purpose of decrypting a received ciphertext message encrypted under device A's certified public key PUMa, the decryption will fail, since device A can no longer recover its privacy keys. In this manner, the network security policy promulgated by the certification center is implemented and enforced.

Although a specific embodiment of the invention has been disclosed, it will be understood by those having skill in the art that changes can be made to the specific embodiment without departing from the spirit and the scope of the invention.

What is claimed is:

1. In a data processing network which includes a first data processor coupled to a second data processor, said first data processor including a first cryptographic system and said second data processor including a second cryptographic system, a method for enforcing a network security policy, comprising steps of:

encoding a network security policy in a first configuration vector at said first data processor and transmitting said first configuration vector to said second data processor;

decoding said first configuration vector in said second data processor and configuring said second data processor in response thereto to implement said network security policy;

storing a public certification key and a private certification key of a certification key pair at said first data processor and transmitting said public certification key to said second data processor;

storing a public utilization key and a private utilization key of a utilization key pair at said second data processor;

transmitting a request from said second data processor to said first data processor to certify said public utilization key;

transmitting a representation of said first configuration vector in an audit record from said second data processor to said first data processor;

verifying said audit record in said first data processor and transmitting a certificate for said public utilization key to said second data processor, said certificate including a digital signature produced by said first data processor using said private certification key; and impairing use of said private utilization key in said second data processor in response to storing a new configuration vector in said second data processor.

2. The method of claim 1, wherein said data processing network further includes a third data processor coupled to said first and second data processors, said third data processor including a third cryptographic system, prior to said step of impairing use of said private utilization key, further comprising the steps of:

transmitting said public certification key to said third data processor;

transmitting said certificate with said public utilization key to said third data processor, said certificate including said digital signature produced by said first data processor using said private certification key; and validating said public utilization key at said third data processor using said public certification key to decrypt said digital signature.

3. The method of claim 1, wherein said step of storing a public utilization key and a private utilization key of a utilization key pair at said second data processor, further comprising the steps of:

storing a master key in said second cryptographic system;

storing a representation of a control vector in said second cryptographic system;

forming an exclusive OR product of said master key and said representation of said control vector;

encrypting said private utilization key using said product as an encryption key, forming an encrypted private utilization key; and said step of impairing use of said private utilization key further comprising the step of altering said master key in response to storing a new configuration vector in said second data processor;

said encrypted private utilization key being incapable of decryption in response to said altering said master key.

4. The method of claim 1, wherein said step of impairing use of said private utilization key further comprises the step of:

altering said private utilization key in response to storing a new configuration vector in said second data processor.

5. The method of claim 1, prior to said step of transmitting said audit record, further comprising the steps of:

storing a public authentication key and a private authentication key of an authentication key pair at said second data processor;

transmitting said public authentication key to said first data processor;

forming an audit digital signature on a representation of said audit record in said second data processor using said private authentication key;

transmitting said audit digital signature with said audit record to said first data processor; and validating said audit record at said first data processor using said public authentication key to decrypt said audit digital signature.

6. The method of claim 5, prior to said step of forming an audit digital signature on a representation of said audit record, which further comprises the steps of:

forming a random number nonce in said first data processor and transmitting said nonce to said second data processor in response to said request to certify said public utilization key; and transmitting said nonce with said audit record from said second data processor to said first data processor.

7. The method of claim 1, wherein said step of encoding a network security policy in a first configuration vector at said first data processor, further comprises the steps of:

storing said first configuration vector in said first data processor;

said step of transmitting said audit record from said second data processor to said first data processor, further comprises the step of including a copy of said first configuration vector in said audit record; and said step of verifying said audit record in said first data processor, further comprises the step of comparing said first configuration vector stored in said first data processor with said copy of said first configuration vector included in said audit record.

8. The method of claim 1, wherein said data processing network further includes a third data processor coupled to said first and second data processors, said third data processor including a third cryptographic system, which further comprises the steps of:

encoding a network security policy in a second configuration vector at said first data processor and transmitting said second configuration vector to said third data processor; and storing said first configuration vector and said second configuration vector in a table in said first data processor.

9. The method of claim 8, which further comprises the steps of:

decoding said second configuration vector in said third data processor and configuring said third data processor in response thereto to implement said network security policy;

said implemented network security policy configuring a first level of security for said second data processor and configuring a second level of security for said third data processor, said first level being a lower security level than said second level.

10. The method of claim 9, prior to said step of impairing use of said private utilization key, further comprising the steps of:

transmitting said certificate with said public utilization key from said second data processor to said third data processor, said certificate including a security indication of said first level of security at said second data processor; and rejecting said public utilization key at said third data processor in response to comparing said security indication from said certificate with said second level of integrity configured at said third data processor.

11. The method of claim 1, which further comprises:

said step of transmitting a request from said second data processor to said first data processor to certify said public utilization key, including transmitting said public utilization key; and said step of verifying said audit record and transmitting said certificate, including transmitting in said certificate said public utilization key accompanied by said digital signature formed using said private certification key.

12. The method of claim 1, which further comprises:

said step of transmitting a request from said second data processor to said first data processor to certify said public utilization key, including transmitting said public utilization key, a source identity value and a control vector for said public utilization key; and said step of verifying said audit record and transmitting said certificate, including transmitting in said certificate said public utilization key said source identity value and said control vector, accompanied by said digital signature formed using said private certification key.

13. In a data processing network which includes a first data processor coupled to a second data processor, said first data processor including a first cryptographic system and said second data processor including a second cryptographic system, a method for enforcing a network security policy, comprising steps of:

encoding a network security policy in a first configuration vector at said first data processor and transmitting said first configuration vector to said second data processor;

decoding said first configuration vector in said second data processor and configuring said second data processor in response thereto to implement said network security policy;

storing a public utilization key and a private utilization key of a utilization key pair at said second data processor;

transmitting a request from said second data processor to said first data processor to certify said public utilization key and a representation of said first configuration vector in an audit record;

verifying said audit record in said first data processor and transmitting a certificate for said public utilization key to said second data processor, said certificate including a digital signature produced by said first data processor using said private certification key; and impairing use of said private utilization key in said second data processor in response to storing a new configuration vector in said second data processor.

14. A computer program in a data processing network which includes a first data processor coupled to a second data processor, said first data processor including a first cryptographic system and said second data processor including a second cryptographic system, said computer program when executed, performing a method for enforcing a network security policy, comprising the sequence of computer program instructions:

encoding instruction for encoding a network security policy in a first configuration vector at said first data processor and transmitting said first configuration vector to said second data processor;

decoding instruction for decoding said first configuration vector in said second data processor and configuring said second data processor in response thereto to implement said network security policy;

first storing instruction for storing a public certification key and a private certification key of a certification key pair at said first data processor and transmitting said public certification key to said second data processor;

second storing instruction for storing a public utilization key and a private utilization key of a utilization key pair at said second data processor;

first transmitting instruction for transmitting a request from said second data processor to said first data processor to certify said public utilization key;

second transmitting instruction for transmitting a representation of said first configuration vector in an audit record from said second data processor to said first data processor;

verifying instruction for verifying said audit record in said first data processor and transmitting a certificate for said public utilization key to said second data processor, said certificate including a digital signature produced by said first data processor using said private certification key; and impairing instruction for impairing use of said private utilization key in said second data processor in response to storing a new configuration vector in said second data processor.

15. A computer program in a data processing network which includes a first data processor coupled to a second data processor, said first data processor including a first cryptographic system and said second data processor including a second cryptographic system, said computer program when executed, performing a method for enforcing a network security policy, comprising the sequence of computer program instructions:

encoding instruction for encoding a network security policy in a first configuration vector at said first data processor and transmitting said first configuration vector to said second data processor;

decoding instruction for decoding said first configuration vector in said second data processor and configuring said second data processor in response thereto to implement said network security policy;

storing instruction for storing a public utilization key and a private utilization key of a utilization key pair at said second data processor;

transmitting instruction for transmitting a request from said second data processor to said first data processor to certify said public utilization key and for transmitting a representation of said first configuration vector in an audit record from said second data processor to said first data processor;

verifying instruction for verifying said audit record in said first data processor and transmitting a certificate for said public utilization key to said second data processor;

impairing instruction for impairing use of said private utilization key in said second data processor in response to storing a new configuration vector in said second data processor.

16. In a data processing network which includes a first data processor coupled to a second data processor, said first data processor including a first cryptographic system and said second data processor including a second cryptographic system, an apparatus for enforcing a network security policy, comprising:

encoding means for encoding a network security policy in a first configuration vector at said first data processor and transmitting said first configuration vector to said second data processor;

decoding means coupled to said encoding means, for decoding said first configuration vector in said second data processor and configuring said second data processor in response thereto to implement said network security policy;

first storing means for storing a public certification key and a private certification key of a certification key pair at said first data processor and transmitting said public certification key to said second data processor;

second storing means for storing a public utilization key and a private utilization key of a utilization key pair at said second data processor;

first transmitting means coupled to said second storing means, for transmitting a request from said second data processor to said first data processor to certify said public utilization key;

second transmitting means coupled to said decoding means, for transmitting a representation of said first configuration vector in an audit record from said second data processor to said first data processor;

verifying means coupled to said second transmitting means, for verifying said audit record in said first data processor and transmitting a certificate for said public utilization key to a certificate storage means in said second data processor, said certificate including a digital signature produced by said first data processor using said private certification key; and impairing means coupled to said decoding means, for impairing use of said private utilization key in said second data processor in response to storing a new configuration vector in said second data processor.

17. The apparatus of claim 16, wherein said data processing network further includes a third data processor coupled to said first and second data processors, said third data processor including a third cryptographic system, which further comprises:

third transmitting means coupled to said first storing means, for transmitting said public certification key to said third data processor;

fourth transmitting means coupled to said certificate storage means, for transmitting said certificate with said public utilization key to said third data processor, said certificate including said digital signature produced by said first data processor using said private certification key; and validating means coupled to said third and said fourth transmitting means, for validating said public utilization key at said third data processor using said public certification key to decrypt said digital signature.

18. In a data processing network which includes a first data processor coupled to a second data processor, said first data processor including a first cryptographic system and said second data processor including a second cryptographic system, an apparatus for enforcing a network security policy, comprising:

encoding means for encoding a network security policy in a first configuration vector at said first data processor and transmitting said first configuration vector to said second data processor;

decoding means coupled to said encoding means, for decoding said first configuration vector in said second data processor and configuring said second data processor in response thereto to implement said network security policy;

storing means for storing a public utilization key and a private utilization key of a utilization key pair at said second data processor;

transmitting means coupled to said storing means, for transmitting a request from said second data processor to said first data processor to certify said public utilization key and for transmitting a representation of said first configuration vector in an audit record from said second data processor to said first data processor;

verifying means coupled to said transmitting means, for verifying said audit record in said first data processor and transmitting a certificate for said public utilization key to said second data processor;

impairing means coupled to said decoding means, for impairing use of said private utilization key in said second data processor in response to storing a new configuration vector in said second data processor.

19. The apparatus of claim 18, which further comprises:

said transmitting means transmitting a request from said second data processor to said first data processor to certify said public utilization key, including transmitting said public utilization key, a source identity value and a control vector for said public utilization key; and said verifying means verifying said audit record and transmitting said certificate, including transmitting in said certificate said public utilization key said source identity value and said control vector, accompanied by said digital signature formed using said private certification key.

20. The apparatus of claim 18, which further comprises:

means for storing said first configuration vector in said first data processor;

said transmitting means transmitting said audit record from said second data processor to said first data processor, including a copy of said first configuration vector in said audit record; and said verifying means verifying said audit record in said first data processor, by comparing said first configuration vector stored in said first data processor with said copy of said first configuration vector included in said audit record.

21. In a data processing network which includes a first data processor coupled to a second data processor, said first data processor including a first cryptographic system and said second data processor including a second cryptographic system, a method for enforcing a network security policy, comprising steps of:

encoding a network security policy in a first configuration vector at said first data processor and transmitting said first configuration vector to said second data processor;

decoding said first configuration vector in said second data processor and configuring said second data processor in response thereto to implement said network security policy;

storing a cryptographic key at said second data processor;

impairing use of said cryptographic key in said second data processor in response to storing a new configuration vector in said second data processor.

22. The method of claim 1, prior to said impairing step, which further comprises the steps of:

storing a public certification key and a private certification key of a certification key pair at said first data processor and transmitting said public certification key to said second data processor;

transmitting a request from said second data processor to said first data processor to certify use of said cryptographic key;

transmitting a representation of said first configuration vector in an audit record from said second data processor to said first data processor;

verifying said audit record in said first data processor and transmitting a certificate use of said cryptographic key to said second data processor, said certificate including a digital signature produced by said first data processor using said private certification key.

23. A computer program in a data processing network which includes a first data processor coupled to a second data processor, said first data processor including a first cryptographic system and said second data processor including a second cryptographic system, said computer program when executed, performing a method for enforcing a network security policy, comprising the sequence of computer program instructions:

encoding instruction for encoding a network security policy in a first configuration vector at said first data processor and transmitting said first configuration vector to said second data processor;

decoding instruction for decoding said first configuration vector in said second data processor and configuring said second data processor in response thereto to implement said network security policy;

storing instruction for storing a cryptographic key said second data processor;

impairing instruction for impairing use of said cryptographic key in said second data processor in response to storing a new configuration vector in said second data processor.

24. In a data processing network which includes a first data processor coupled to a second data processor, said first data processor including a first cryptographic system and said second data processor including a second cryptographic system, an apparatus for enforcing a network security policy, comprising:

encoding means for encoding a network security policy in a first configuration vector at said first data processor and transmitting said first configuration vector to said second data processor;

decoding means coupled to said encoding means, for decoding said first configuration vector in said second data processor and configuring said second data processor in response thereto to implement said network security policy;

storing means for storing a cryptographic key at said second data processor;

impairing means coupled to said decoding means, for impairing use of said cryptographic key in said second data processor in response to storing a new configuration vector in said second data processor.

* * * * *